(12) United States Patent
Sung

(10) Patent No.: US 8,196,977 B2
(45) Date of Patent: Jun. 12, 2012

(54) DOOR HANDLE STRUCTURE FOUND ON THE OUTSIDE OF VEHICLE

(75) Inventor: Do Won Sung, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 372 days.

(21) Appl. No.: 12/500,265

(22) Filed: Jul. 9, 2009

(65) Prior Publication Data

US 2010/0117381 A1 May 13, 2010

(30) Foreign Application Priority Data

Nov. 13, 2008 (KR) ........................ 10-2008-0112693

(51) Int. Cl.
*E05B 3/00* (2006.01)

(52) U.S. Cl. ............... 292/336.3; 292/92; 292/DIG. 65; 340/641; 340/425.5; 340/426.28

(58) Field of Classification Search ............... 292/336.3; 340/641, 425.5, 426.28
See application file for complete search history.

(56) References Cited

U.S. PATENT DOCUMENTS

| | | | | |
|---|---|---|---|---|
| 2,273,570 | A * | 2/1942 | Greenlees | 362/501 |
| 5,297,010 | A * | 3/1994 | Camarota et al. | 362/501 |
| 6,164,805 | A * | 12/2000 | Hulse | 362/501 |
| 6,848,818 | B2 * | 2/2005 | Huizenga | 362/501 |
| 7,055,997 | B2 * | 6/2006 | Baek | 362/501 |
| 7,057,124 | B2 * | 6/2006 | Ieda et al. | 200/61.62 |
| 7,333,021 | B2 * | 2/2008 | Ieda et al. | 340/641 |
| 7,819,442 | B2 * | 10/2010 | Ieda et al. | 292/336.3 |
| 2002/0030594 | A1 * | 3/2002 | Inaba et al. | 340/562 |
| 2002/0030988 | A1 | 3/2002 | Stapf | |
| 2003/0122556 | A1 * | 7/2003 | Sueyoshi et al. | 324/686 |
| 2004/0075531 | A1 * | 4/2004 | Ieda et al. | 340/5.72 |
| 2004/0104815 | A1 * | 6/2004 | Suyama et al. | 340/426.16 |
| 2004/0223336 | A1 * | 11/2004 | Murakami et al. | 362/501 |
| 2005/0047162 | A1 * | 3/2005 | Baek | 362/501 |

FOREIGN PATENT DOCUMENTS

| | | |
|---|---|---|
| JP | 08-318783 A | 12/1996 |
| JP | 2004-244990 A | 9/2004 |
| KR | 97-39571 U | 7/1997 |
| KR | 1999-0019637 U | 6/1999 |
| KR | 10-2006-0046898 A | 5/2006 |

\* cited by examiner

*Primary Examiner* — Thomas Beach
*Assistant Examiner* — Sajid R Ansari
(74) *Attorney, Agent, or Firm* — Morgan, Lewis & Bockius LLP

(57) ABSTRACT

A door handle structure found on the outside of a vehicle may include a door handle including a handle base member installed to the inside of a door panel and a handle grip member coupled to the outside of the door panel, wherein a portion of the handle grip member is pivotally coupled to the handle base member, and a lighting device installed to the door panel, having at least a light emitting diode (LED) lamp which is installed at the handle base member and configured to emit a light source through a recess formed on the door panel, and a band member configured to receive the light source through the recess from the LED lamp and emit the light source towards the outside of the vehicle.

3 Claims, 5 Drawing Sheets

DOOR HANDLE STRUCTURE FOUND ON THE OUTSIDE OF VEHICLE

CROSS-REFERENCE TO RELATED APPLICATION

The present application claims priority to Korean Patent Application Number 10-2008-112693 filed Nov. 13, 2008, the entire contents of which application is incorporated herein for all purpose by this reference.

BACKGROUND OF THE INVENTION

1. Field of the Invention

The present invention relates to a door handle structure found on the outside of a vehicle, and more particularly, to a handle structure found on a door facing the outside of a vehicle that comprises a light device equipped with a light emitting diode (LED), thereby improving visibility and aesthetic quality.

2. Description of Related Art

In general, a door handle is composed of an outer door handle and an inner door handle which is distinguishable by the fact that the outer door handle faces the outside of a vehicle and the inner door handle faces the inside of a vehicle. Depending on methods of operating a handle, a door handle may be divided into two types, a lift-up handle and a grip handle which includes a hinge positioned at one side of the handle.

When a door lock is released by a remote control key, a driver welcome function is set to unlock a door lock condition and guide a vehicle location through lighting of an interior light and an emergency light. As a result, it is easy to find a vehicle in the dark such as at night or an underground parking lot.

Although the remote control key facilitates releasing a door lock and searching for the location of a vehicle, it is difficult to see a door handle for opening a door of the vehicle in the dark.

In order to facilitate finding a door handle, a door handle on the outside of a vehicle is equipped with a light device that lights up.

As shown in FIGS. 1 and 2, the structure of a door handle found on the outside of a vehicle according to prior art comprises a handle grip unit 20 installed on a door panel 10 as a door handle found on the outside of a vehicle in which one surface of the handle grip unit is hinge-coupled, a LED lamp 30 mounted on the other surface of the handle grip unit 20, a connector (not shown) located at a hinge unit of the handle grip unit 20 and connected to the LED lamp 30, and a body control module (not shown) configured to control lighting of the LED lamp 30.

In the aforementioned structure of the door handle found on the outer side of a vehicle, when the door lock condition is released by the remote control key, the interior light and the emergency light (not shown) are turned on while the LED lamp 30 is lighted up which uses a power source transmitted through the body control module and the wire connector. As a result, it is easy to find the location of the handle grip unit 20 in the dark such as at night or an underground parking lot.

However, since the LED lamp 30 is installed on the other surface of the handle grip unit 20 in the aforementioned door handle structure found on the outside of a vehicle, the top end of the LED lamp 30 is hitched in manipulation of the handle grip unit 20 so as to degrade the manipulation. When the handle grip unit 20 is pulled, a distance between the LED lamp 30 and the door panel 10 becomes longer so as to cause imbalance of illumination. When the illumination of the LED lamp 30 is lighted in order to prevent the imbalance of illumination, effulgence occurs to degrade merchantability.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a door handle structure found on the outside of a vehicle that may prevent a LED lamp from being hitched by fingers in manipulation of door handle found on the outside of a vehicle and improve visibility and aesthetic quality with the same illumination.

In an aspect of the present invention, the door handle structure found on the outside of a vehicle, may include a door handle including a handle base member installed to the inside of a door panel and a handle grip member coupled to the outside of the door panel, wherein a portion of the handle grip member is pivotally coupled to the handle base member, and a lighting device installed to the door panel, including at least a light emitting diode (LED) lamp which is installed at the handle base member and configured to emit a light source through a recess formed on the door panel, and a band member configured to receive the light source through the recess from the LED lamp and emit the light source towards the outside of the vehicle.

The band member may enclose a contacting surface of the door panel and the door grip member.

In another aspect of the present invention, the band member may substantially enclose the contacting surface of the door panel and the door grip member.

The band member may be made of transparent or semi-transparent synthetic resin

The band member may have one color selected from red, white, yellow, blue and green.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various exemplary embodiments of the present invention will now be described in detail with reference to FIGS. 3 to 6.

A door handle structure found on the outer side of a vehicle in various embodiments of the present invention includes a door panel in which a LED lamp is installed. A light source of the LED lamp is illuminated in the direction of the door handle, thereby maintaining illumination of the light source and visibility of the door handle.

The door handle structure found on the outer side of a vehicle of the present invention, which is used to open and close a door, may be limited to a grip-type structure located on the door on the outside of a vehicle.

For explanation of the present invention, the same reference numbers are used in the same configuration as that of the prior art, and thus repeated descriptions will be omitted.

Figure 1:
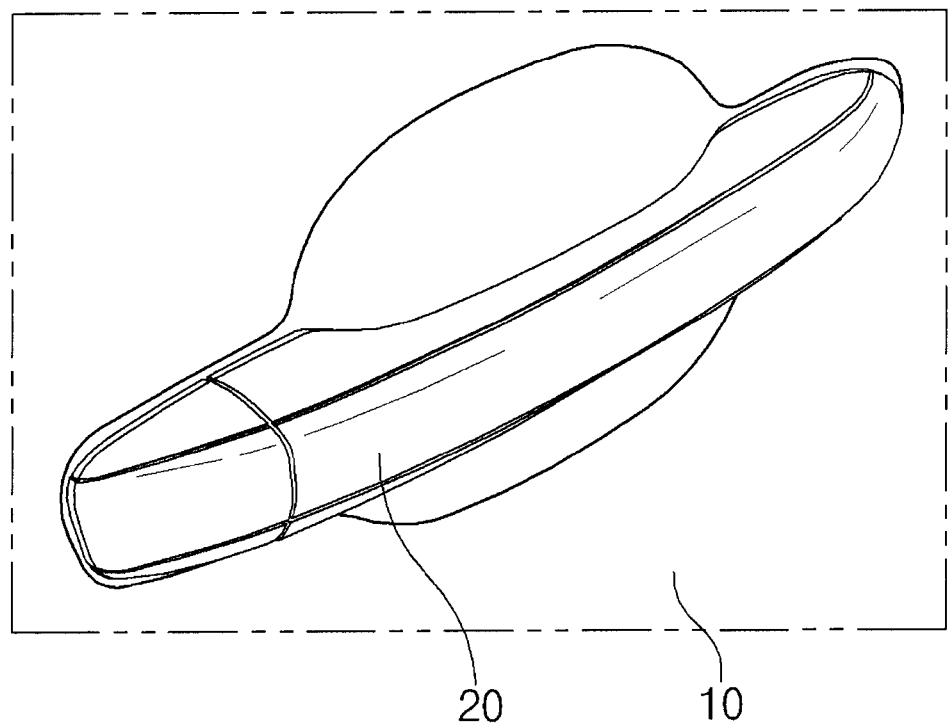
FIG. 1 is a perspective view showing a door handle structure found on the outer side of a vehicle according to the prior art.
Figure 2:
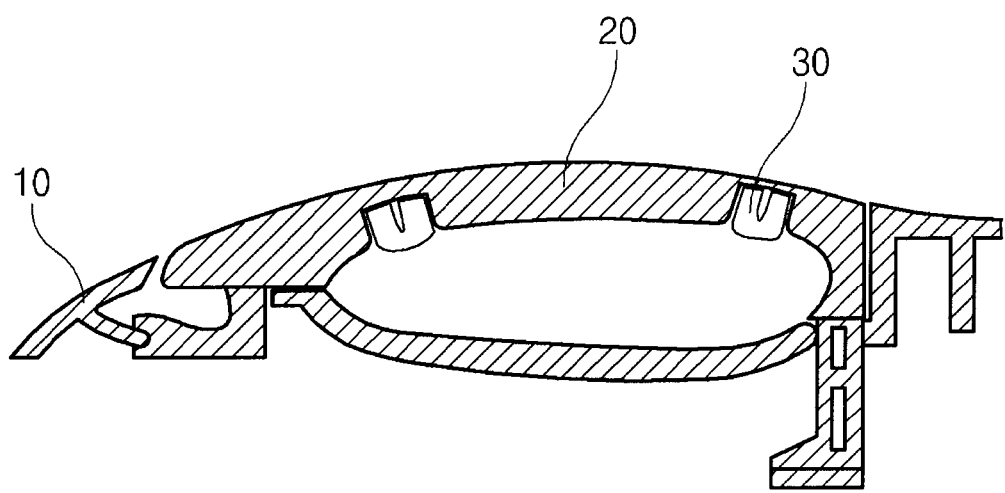
FIG. 2 is a cross-sectional view of FIG. 1.
Figure 3:
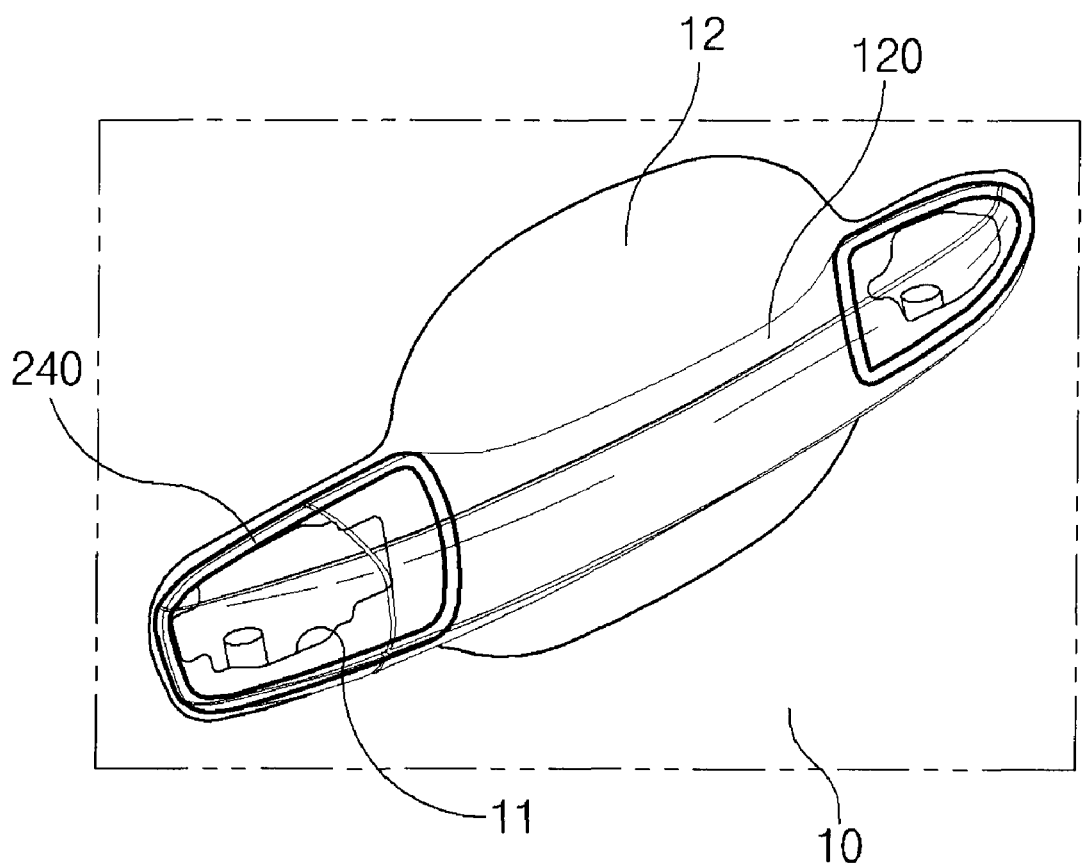
FIG. 3 is a perspective view showing an exemplary door handle structure found on the outer side of a vehicle according to the present invention.
Figure 4:
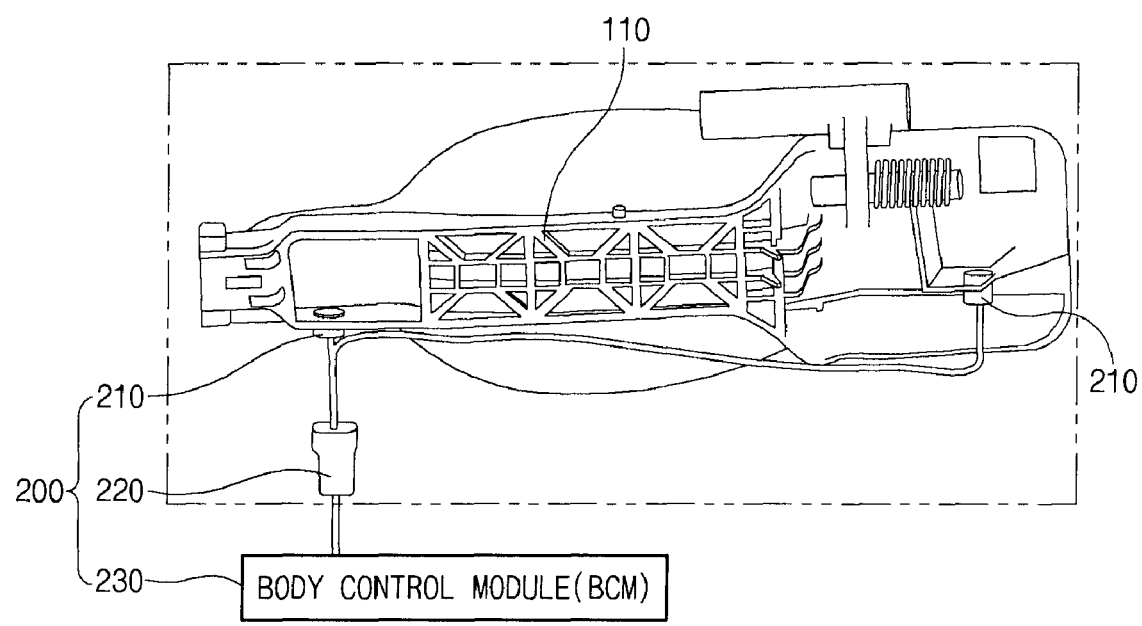
FIG. 4 is a perspective view showing an exemplary light device according to the present invention.
Figure 5:
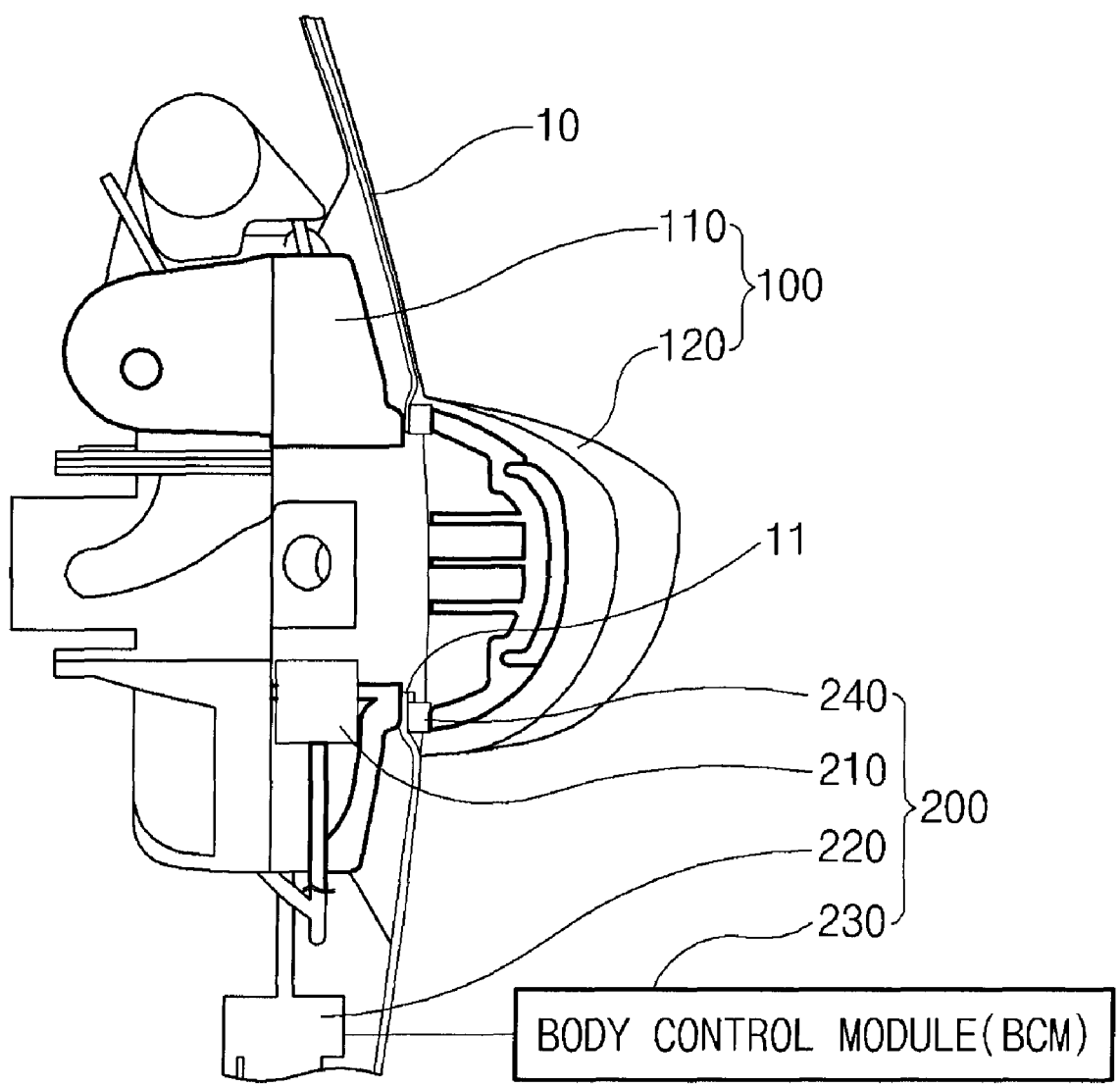
FIG. 5 is a cross-sectional view showing an exemplary door handle structure found on the outer side of a vehicle according to the present invention.

As shown in FIGS. 3 to 5, the door handle structure found on the outer side of a vehicle comprises a door handle 100 installed on a door panel 10 and configured to open and close a door, and a light device 200 installed on the inside of the door handle 100 and configured to emit a light source toward the outside of a vehicle through a recess 11 located on the door panel 10, thereby increasing visibility of the door handle 100.

The door handle 100 configured to open and close the door includes a handle base member 110 installed on the inside of the door panel 10, and a handle grip member 120 installed on the outside of the door panel 10 corresponding to the handle base member 110 and configured to open and close the door. One side of the handle grip member 120 is hinge-coupled to the handle base member 110.

That is, when the door handle 100 is pulled while the handle grip member 120 is held, the handle grip member 120 is pulled based on the handle base member 110, and a lock condition of a lock device installed at the door panel 10 is released.

A concave unit 12 formed to be concave so that a hand may be put thereto is located on the outside of the door panel 10 corresponding to the other surface of the handle grip member 120.

That is, the handle grip member 120 is easier to hold because of the concave shape of the concave unit 12.

The door handle 100 that includes the handle base member 110 and the handle grip member 120 has been well-known as the prior art, and thus its detailed description will be omitted.

The light device 200 that increases visibility of the door handle 100 includes a plurality of LED lamps 210, a wire connector 220, a body control module (BCM) 230 and a band member 240. The LED lamps 210 may be installed on both sides of coupling surfaces of the handle base member 110 and the door panel 10. The wire connector 220 is configured to connect the LED lamps 210 in parallel. The body control module 230 is configured to control lighting of the LED lamps 210. The band member 240 may be disposed to enclose the coupling surfaces of the door panel 10 and the handle grip member 120, and configured to emit a light source received from the LED lamp 210 toward the outside of a vehicle.

The LED lamps 210 are installed, respectively, at both sides of the handle base member 110. The whole door handle 100 can be illuminated through the LED lamp 210, thereby obtaining excellent visibility.

The wire connector 220 is connected to the body control module 230 configured to control lighting of the LED lamp 210. The body control module 230 is connected to a power supply unit.

The BCM 230 has a function of lighting the door handle 100, more specifically the LED lamp 210, as well as a welcome function in a door open mode and a function of lighting a taillight to confirm a successful operation.

The band member 240 is connected to a band shape along the circumference between the contact surface of the door panel 10 and the handle grip member 120. The band member 240 is made of a transparent or semi-transparent synthesis resin so as to improve permeability of the light source. The band member 240 is one color selected from red, white, yellow, blue and green.

That is, through the band member 240, a light from the LED lamp 210 can be changed into various colors depending on the type of vehicle, thereby improving aesthetic quality.

Figure 6:
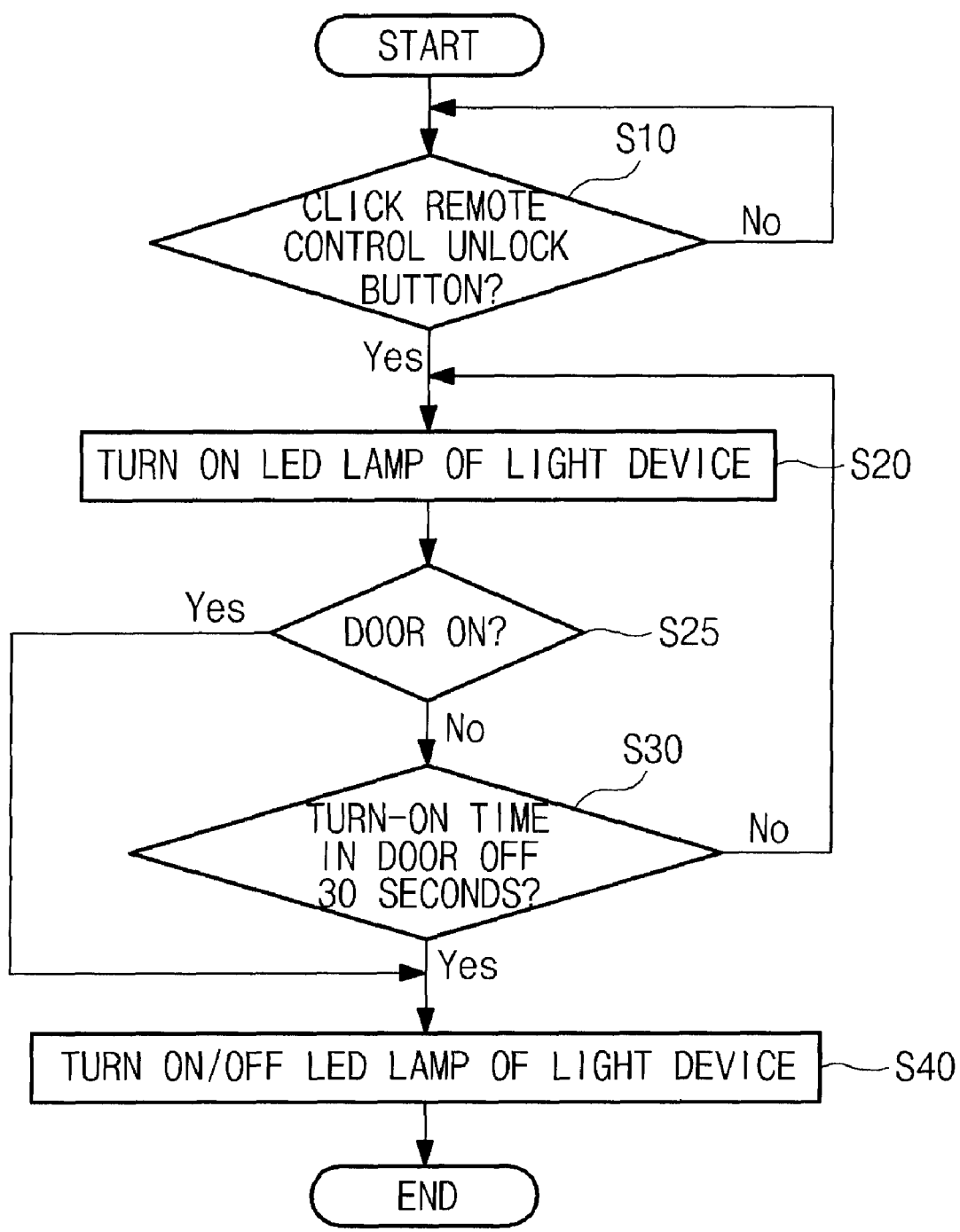
FIG. 6 is a flow chart showing the operation of the door handle structure found on the outer side of a vehicle according to the present invention.

The operation of the above door handle structure found on the outer side of a vehicle is described with reference to FIG. 6.

When an unlock button of a remote control key is clicked to release a door lock condition (S10), the BCM 230 sends a lighting signal to an interior light device and an emergency light device, and simultaneously sends a lighting signal to the LED lamp 210 connected to the wire connector 220 of the light device 200.

The LED lamp 210 that receives the lighting signal illuminates a light source toward the other side direction of the handle grip member 120 through a recess 12 of the door panel 10, so that the illuminated light source penetrates the band member 240, and is emitted toward the outside of the handle grip member 120. As a result, it is easy to release the lock condition of the door and find the location of the vehicle and door handle 100 (S20).

Thereafter, when the door is open (S25), the LED lamp 210 is automatically turned on and off by the BCM 230. Meanwhile, when a door is not opened while the duration of the LED lamp 210 being turned on exceeds 30 seconds (S30), the LED lamp 210 is automatically turned on and off by control of the BCM 230 (S40).

Furthermore, it is easy to find the door handle 100 in the dark such as at night through the aforementioned operation, thereby improving aesthetic quality.

Accordingly, the door handle structure found on the outer side of a vehicle according to various embodiments of the present invention comprises a light device equipped with a LED lamp positioned between a handle base member and a handle grip member, thereby improving visibility of the door handle and maintaining illumination of a light source in manipulation of the door handle. Furthermore, the light source can be illuminated as various colors so as to improve aesthetic quality.

For convenience in explanation and accurate definition in the appended claims, the terms "inside" and "outside" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door handle structure found on the outside of a vehicle, comprising:
    a door handle including a handle base member installed to the inside of a door panel and a handle grip member coupled to the outside of the door panel, wherein a portion of the handle grip member is pivotally coupled to the handle base member, and wherein the door panel and the handle grip member form a contacting surface therebetween when the door handle is locked; and
    a lighting device installed to the door panel, including:
        at least a light emitting diode (LED) lamp which is installed at the handle base member and configured to emit a light source through a recess formed on the door panel; and
        a band member configured to receive the light source through the recess from the LED lamp and emit the light source towards the outside of the vehicle;
    wherein the band member surrounds the contacting surface between the door panel and the handle grip member.

2. The handle structure as claimed in claim 1, wherein the band member is made of transparent or semitransparent synthetic resin.

3. The handle structure as claimed in claim 1, wherein the band member has one color selected from red, white, yellow, blue and green.

* * * * *